Aug. 31, 1943. H. G. OTT 2,328,485
INDICATING INSTRUMENT
Filed March 9, 1939
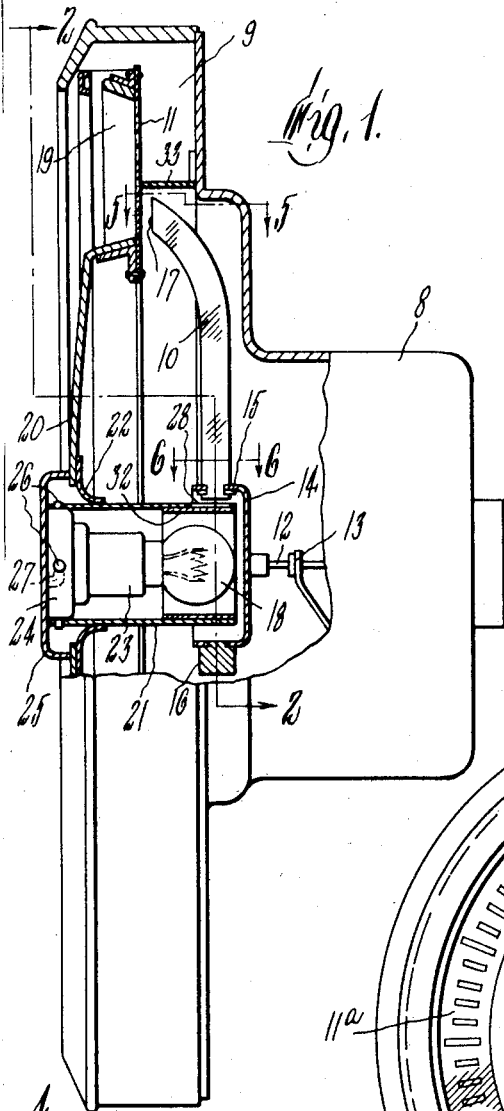
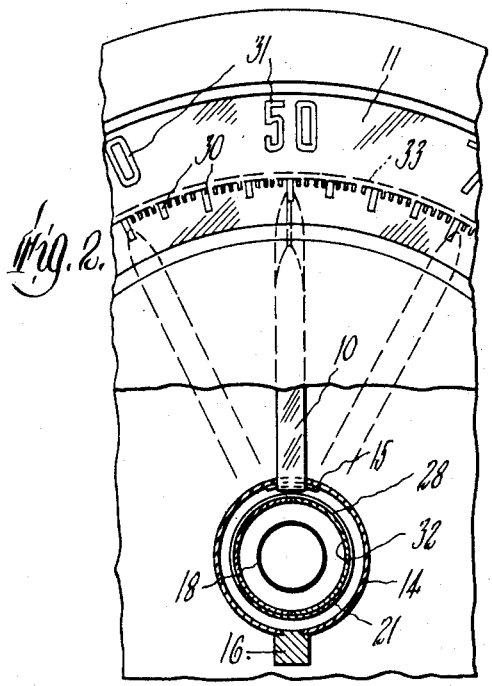
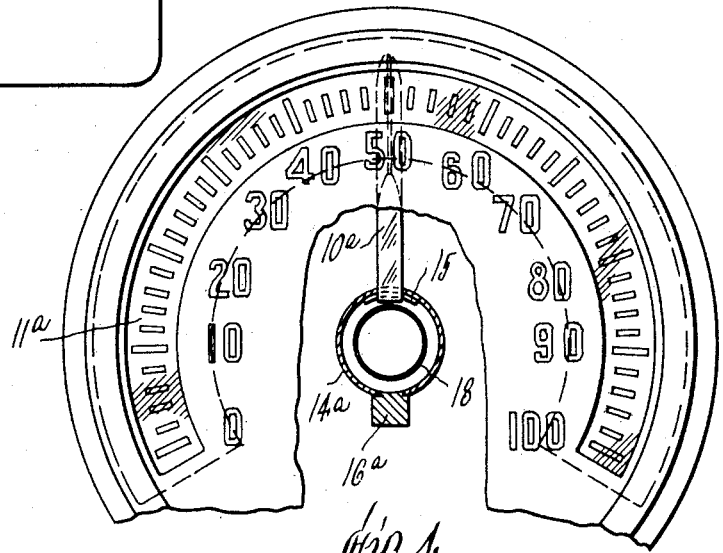
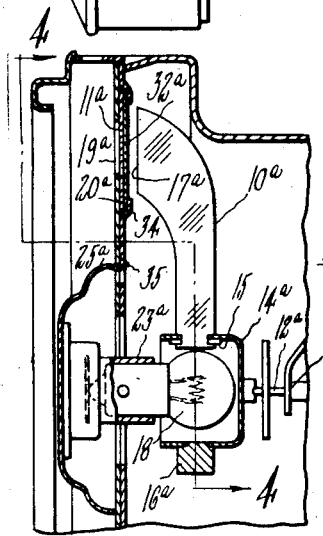
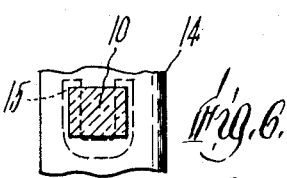
Inventor
Harry G. Ott Patented Aug. 31, 1943

2,328,485

UNITED STATES PATENT OFFICE 2,328,485

INDICATING INSTRUMENT

Harry G. Ott, Waltham, Mass., assignor to Waltham Watch Company, Waltham, Mass., a corporation of Massachusetts Application March 9, 1939, Serial No. 260,771

11 Claims. (Cl. 116—129)

This invention relates to indicating instruments of the type wherein the indication is given by a hand or pointer traveling across a dial or scale, or vice versa. It is adapted particularly for uses in which a distinctive and arresting indication is desired when the values denoted by the instrument have exceeded a quantity or stage which has been predetermined as a safe limit or a critical value. As examples of what I have in mind I may mention speedometers for automobiles and other vehicles, which show all values within the utmost speed of which the automobile is capable. The laws and police authorities of many communities have established limits of what are considered as safe operating speeds. It is therefore desirable that a speedometer should not only indicate the exact present speed, but also indicate in a distinctive way the fact that the safe speed has been exceeded when such is the fact. Other possible uses are for indicating the oil pressure of the engine lubricating system in an automobile and emphasizing the indication when the pressure is lower than the safe degree; for indicating the temperature of the engine cooling fluid and distinctively emphasizing the indication when the safe temperature is exceeded.

The uses above named are all served by dashboard instruments of an automobile, and from that point of view the invention can be considered as relating generically to such dashboard instruments. But it is not limited to those uses, and it includes all embodiments and equivalent variants of the illustrative instrument and means hereinafter described, for all uses and in any environment in which they may have utility.

The objects of the invention include—

(a) The provision of means in an instrument of the type described for showing present and changing values and, at the same time, distinctively indicating all such values as are beyond the limit of safety or some other predetermined limiting or critical value;

(b) To effect these indications by illumination and changes in the color of the light affording the illumination;

(c) To provide in connection with instruments of the type described, but without limitation to distinctive means for differentiating indications on opposite sides of a critical point, a light transmitting pointer which makes its indications by casting a beam of light on a dial or scale. The foregoing statement of objects is not exhaustive, and other objects are indicated within the following explanation.

The instrument chosen for illustration of the invention is a speedometer designed to be applied to the instrument board of an automobile, two forms of such instrument being shown to illustrate some of the many possible variants of the invention. In view of the preceding statement of the nature of the invention, it will be understood that the specific illustrations herein are not limiting of the scope of protection claimed except as to such claims as are definitely limited by their terms.

In the drawing—

Fig. 1 is in part a vertical section and in part a side elevation of a speedometer instrument embodying the invention;

Fig. 2 is a partial front elevation and partial section taken on line 2—2 of Fig. 1;

Fig. 3 is a sectional view of a different form of speedometer instrument containing the same invention;

Fig. 4 is a partial front elevation and partial section taken on line 4—4 of Fig. 3;

Figs. 5 and 6 are detail sectional views taken on lines 5—5 and 6—6 respectively of Fig. 1.

Like reference characters designate the same parts wherever they occur in all the figures.

The instrument shown in Figs. 1 and 2 includes a casing 8 in which the speed responsive movement is contained, and an enlargement 9 in which a hand or pointer 10 and dial 11 are contained. The means by which an angular displacement is imparted to the pointer 10 proportional to the speed of the vehicle are not material to the present invention and are not shown. It is sufficient to say that any magnetic, centrifugal, or other means now known to the art, or which may hereafter be developed, may be used. I have combined the invention with a speedometer instrument of a standard commercial magnetic type.

The pointer 10 is carried by a rotatable shaft 12 supported in bearings 13, only one of which is shown in Fig. 1. This shaft is coaxially united to the bottom or end wall of a cup 14, which latter therefore turns with the shaft. The pointer 10 is mounted in one side of the cup, extending radially therefrom and passing through the side wall. It is made fast therein by a spring clip 15 of well known character. A counterbalance weight 16 is secured to the side of the cup at a point diametrically opposite to the pointer.

The pointer is a bar or rod of transparent material, curved at its outer end toward the plane of the dial and tapered on both sides at and near its extremity to a narrow blunt edge 17 back of the dial 11, parallel to and near the rear surface of the dial but separated therefrom by a space wide enough to permit free movement. Any transparent material sufficiently rigid to retain its shape and sufficiently tough to escape fracture under operating conditions may be employed for making this pointer. For instance, plastics of the heat hardening type already known and available on the market are suitable for the purpose.

Light rays from a light source 18 at the axis around which the pointer swings impinge on the adjacent end of the pointer and are conducted throughout its length and emitted in a narrow beam from the edge 17 against the back of the dial 11, such dial being translucent. In order that the light may not be diffused from the sides of the pointer and give an undesired illumination within the casing, such sides are preferably covered with an opaque substance. The cross section of the pointer may have any desired one of many different shapes; the particular section indicated in the drawing is in no sense a limitation of the invention in this regard.

The dial 11 is a plate of translucent material, which may be glass, but is preferably a tough plastic of the heat-hardening type. It is fastened, as shown in Fig. 1, across the back of an arcuate opening 19 in an opaque plate 20 which is secured by supporting means (not here shown) to the casing. A tube 21 coaxial with the shaft 12 is secured to the plate 20 by a ring 22 and passes through a hole in the center of the plate. The light source 18 is an electric light bulb mounted in a socket 23, the base 24 of which is united to a shallow cup 25 and has lateral studs 26 contained in angle slots 27 in the end of tube 21. Cup 25 covers the hole in the center of plate 20 and serves as a handle by which the lamp socket base may be disengaged from the tube 21, and reengaged when it is necessary to renew a light bulb.

All of the parts thus far described, except the pointer, dial and light bulb, are opaque. But there is an open slot 28 in the side of the tube 21, the edges of which are in approximate register with the planes bounding the space in which the pointer swings. This slot extends angularly around the axis of the tube a distance slightly greater than the arc through which the pointer may swing, and is properly located to permit light from the bulb to impinge on the arm when the latter is in any position within its total range of movement. Likewise the window 19 and dial 11 extend through an arc concentric with the axis of rotation of the pointer and substantially coextensive with the travel of the extremity of the pointer. The dial is provided as usual with graduations 30 and figures 31 designating rates of speed.

It will be apparent from the foregoing that the position of the pointer is shown on the dial by a bar of light, produced by the beam which is conducted by the pointer from the light source, and that the position of this bar of light on the dial indicates the instantaneous speed of the vehicle.

The object of emphasizing the transition from a safe to a dangerous speed is accomplished by causing the color of the light to change when the pointer passes the point indicating the predetermined safe speed. Such color change is accomplished by a strip 32 of colored pyroxylin or other suitable transparent or translucent material mounted within the tube 21 across the slot 28. The colored material covering that part of the slot which corresponds to the safe speed range is colored green, and that crossing the rest of the slot is red. It may be assumed for the convenience of this explanation that the dividing limit is fifty miles per hour. Hence, all indications below that limit are made by a bar of green light, while whenever the speed becomes higher than fifty miles per hour, a bar of red light makes the indications. This color change is more striking and more readily apparent than the figures on the dial, and enables the driver to keep on the safe side of the speed limit without devoting the close attention needed to read the figures of the dial. It is a safety measure in that it enables the driver to keep his attention more steadily on the road ahead.

The colors may be other than those illustratively named above and may be otherwise located to control the light on other parts of the dial. Thus, for example, I may interpose a band of yellow in the colored strip 32 between the bands of green and red, and locate the divisions between these different colors so as, say, to cause the indications to be given in green for speeds up to thirty five miles per hour, in yellow for speeds between thirty five and forty five, and in red for all speeds higher than forty five miles per hour. The exact locations of the divisions between the different colors are of course dependent on the regulations in the community where the instrument is used and, subject to these regulations, on the personal desires of the user.

So that the light beam projected from the end of the pointer and its impingement on the dial may be more conspicuous, a baffle 33 is placed across the space between the dial and the adjacent rear wall of the casing. This baffle is a strip of opaque material curved cylindrically about the axis of the pointer near the orbit of its outer end. It meets the back of the dial on a line intermediate the inner and outer boundaries of the dial.

The embodiment of the invention shown in Figs. 3 and 4 is essentailly like that above described, but differs in some details. The parts which correspond to parts hereinbefore described are designated by the same reference numbers modified by the exponent $a$. The main difference in this second embodiment is that the light is not enclosed within a tube entering the cup which carries the pointer, but the corresponding cup 14a is made of greater depth and itself serves as a shroud to occlude most of the light rays from the lamp except those which enter the transparent pointer. The color screen in this instance is a curved strip 32a of translucent pyralin or other suitable material placed against the rear side of the dial 11a on the back of the dial plate 20a and secured by the holder 34 which secures the dial. In this instance the graduations 30 are printed or marked on the translucent dial 11a, while the numbers 31 are applied to the opaque dial plate. The cup 25a which covers the central hole in the dial plate and to which the base of the lamp socket is secured, is mounted and connected to the dial plate in a readily detachable manner by spring tongues 35 on its rim. Such tongues pass through slots in the dial plate and are formed with inclined bends or offsets whereby they serve as yieldable latches.

It will be obvious that instruments essentially like those described may be adapted to show specifically different values in different environments, such as temperatures, pressures, etc., by applying means of known character to move the pointer in response to differences in the forces or values being measured and by substituting dials with appropriate markings. The means by which the pointer is moved and the specific markings on the dial are not of the essence of the invention and may be of any presently known or later to be developed character suitable for the purpose for which the invention may be applied. The gist of the invention resides in the combination of pointer, light source and dial or scale, with means for changing the color characteristics of the light beam, substantially as described and in equivalent embodiments. Equivalents of the embodiments herein described include, for example, reversals wherein the dial is moved relatively to the pointer or light source, and other means for changing the color characteristics of the light beam appearing on the dial.

What I claim and desire to secure by Letters Patent is:

1. A speedometer for a motor vehicle including an opaque front member having an aperture therein of a size at least sufficient to permit the ready introduction and withdrawal therethrough of a relatively small light bulb, an arcuate non-opaque scale graduated in speed units arranged concentric with said aperture, said scale being visible from in front of said speedometer, an elongated accurately balanced radially-extending pointer, made of a light-transmitting material capable of conducting light rays around a bend supported behind said opaque front member for rotational movement about an axis passing through said aperture, the pointer having its radially outermost end portion bent towards said non-opaque scale and terminating in a radially-extending narrow zone, and having its radially innermost end portion extending towards and terminating short of said axis of rotation, a relatively small light bulb insertable through the front of said aperture into a position in operative juxtaposition with the radially innermost end of said pointer, and bulb positioning and holding means having no physical connection with the pointer for guiding said light bulb into and thereafter securely fixedly holding said bulb in such position, whereby light rays emitted by the stationary bulb will be conducted through the body of said movable pointer and cast forwardly through the non-opaque scale thereby clearly to indicate the position of said pointer from in front of said scale.

2. A speedometer for a motor vehicle including an opaque front member having an aperture therein of a size at least sufficient to permit the ready introduction and withdrawal therethrough of a relatively small light bulb, a non-opaque scale graduated in speed units spaced from said aperture, said scale being visible from in front of said speedometer, an elongated accurately balanced radially-extending pointer, made of a light-transmitting material, supported behind said opaque front member for rotational movement about an axis passing through said aperture, said pointer in all of its operative positions presenting a radially extending narrow edge portion immediately behind said non-opaque scale, the radially innermost end portion of said pointer extending towards and terminating short of said axis of rotation, a relatively small light bulb axially insertable through the front of said aperture into a position in juxtaposition with the radially innermost end of said pointer whereby light rays emitted by said bulb will pass through the light-transmitting pointer, and then through said non-opaque scale so as to be visible from in front thereof, means having no physical connection with the pointer for securely holding said light bulb fixedly in said position, and a stationary color filter interposed between said fixed light bulb and the radially innermost end of said movable pointer for coloring light rays before they pass through said scale.

3. A speedometer for a motor vehicle including a front central opaque member, an arcuate non-opaque scale graduated in speed units, said scale being visible from in front of said speedometer, an elongated radially-extending pointer, made of a light-transmitting material capable of conducting light rays around a bend supported behind said front central opaque member for rotational movement about an axis passing generally through the imaginary center of said arcuate scale, the pointer having its radially outermost end portion bent towards said scale and terminating in a relatively narrow radially-extending zone and having its radially-innermost end portion extending towards and terminating short of said axis of rotation, pointer-balancing means disposed on the opposite side of said axis of rotation, and bulb positioning and holding means free of said pointer for guiding a light-bulb into and thereafter securely holding said bulb in a fixed position at the axis of said pointer near the radially innermost pointer end, whereby light rays emitted by said bulb will be conducted through the body of said pointer and cast forwardly through the non-opaque scale thereby clearly to indicate the position of said pointer to an observer in front of said scale.

4. A dashboard instrument for a motor vehicle including a front opaque portion bearing an aperture of a size at least sufficient to permit the ready introduction and withdrawal therethrough a relatively small electric light bulb, adjacent relatively movable scale and pointer elements for indicating any desired factor, bulb guiding and holding means for guiding said bulb into, and securely holding said bulb in, an operative instrument-illuminating position wherein it will make the instantaneous relative position of said scale and pointer elements clearly visible, and a readily removable cover member for covering said aperture after the bulb has been operatively inserted therein, said bulb being readily movable into and extractable from its operative instrument-lighting position directly through the front of said dashboard.

5. In combination, an instrument dial plate, a rotatable spindle adjacent said dial plate, an opaque substantially circular hub attached to said spindle, said hub having a portion which is provided with an opening, a pointer of light-transmitting material extending from the hub at said opening and radially outward therefrom, and a light-emitting element disposed at one side of the spindle and substantially in alignment with the path traversed by the opening in said hub, together with an arcuate color screen fixedly supported in coaxial relation to the spindle between said light-emitting element and the opening in said hub, whereby the light from said light-emitting element modified by the color screen passes through said opening and illuminates the pointer.

6. A speedometer for a motor vehicle including a front opaque member, an arcuate non-opaque scale graduated in speed units and visible from in front of said speedometer, an elongated radially-extending pointer made of light-transmitting material supported behind said front opaque member for rotational movement about an axis passing generally through the imaginary center of said arcuate scale, the pointer having its radially outermost portion bent towards said scale and terminating in a relatively narrow radially-extending zone and having its radially innermost end portion extending towards and terminating short of said axis of rotation, said pointer being coated, at least on its outer surface at said bend, with a light-confining material, pointer-balancing means disposed on the opposite side of said axis of rotation, and bulb positioning and holding means free of said pointer for guiding a light-bulb into and thereafter securely holding said bulb in a fixed position at the axis of said pointer near the radially innermost pointer end, whereby light rays emitted by said bulb will be conducted through the body of said pointer and around said bend and cast forwardly through the non-opaque scale thereby clearly to indicate the position of said pointer to an observer in front of said scale.

7. A speedometer for a motor vehicle including a front opaque member, an arcuate non-opaque scale graduated in speed units and visible from in front of said speedometer, an elongated radially-extending translucent pointer having two angularly related end portions, means interposed between said portions for bending light rays from one end portion to pass longitudinally through the other end portion, said pointer being supported behind said front opaque member for rotational movement about an axis passing generally through the imaginary center of said arcuate scale, the pointer having its radially outermost end portion directed toward said scale and terminating in a relatively narrow radially-extending zone and having its radially innermost end portion extending toward and terminating short of said axis of rotation, pointer balancing means disposed on the opposite side of said axis of rotation, and bulb positioning and holding means free of said pointer for guiding a light bulb into and thereafter securely holding said bulb in a fixed position at the axis of rotation of said pointer near the radially innermost end of the pointer, whereby light rays emitted by said bulb will be conducted through the end portions of said pointer and emitted forwardly through the non-opaque scale thereby clearly to indicate the position of said pointer to an observer in front of said scale.

8. In combination, an instrument dial plate, a rotatable spindle adjacent said dial plate, an opaque, substantially circular hub attached to said spindle, said hub having a portion which is provided with an opening, a pointer of light-transmitting material extending from the hub at said opening radially outward therefrom, and a light-emitting element disposed adjacent the spindle and substantially in alignment with the path traversed by the opening in said hub, together with an arcuate color screen fixedly supported in coaxial relation to the spindle between said light-emitting element and the opening in said hub, whereby the light from said light-emitting element modified by the color screen passes through said opening and illuminates the pointer.

9. In a scale having a movable element and a stationary dial with graduations thereon, the combination of a housing carried by said movable element, a stationary lamp disposed in said housing, and a light transmitting member extending into and carried by said housing, said member having a portion illuminated by light transmitted through the member from said lamp, and said illuminated portion being disposed for movement adjacent said graduations.

10. In a device having a movable element and a stationary dial having portions at least translucent; the combination of a stationary source of light, an indicator operated in conjunction with the movement of said element, and means including at least one light transmitting member associated with said light source and operable to illuminate one of said portions of said dial during a given movement of said indicator.

11. In a scale having a movable element and a stationary dial, the combination of a housing carried by said movable element, a stationary lamp disposed in said housing, said housing having an opening, a light transmitting member mounted for movement with said housing and having a portion thereof exposed through said opening in light receiving relation to said lamp, said member having a light emitting portion disposed for movement adjacent said dial.

HARRY G. OTT.